United States Patent
Park et al.

(10) Patent No.: US 8,838,155 B2
(45) Date of Patent: *Sep. 16, 2014

(54) METHOD FOR UPDATING LOCATION IN A WIRELESS COMMUNICATION SYSTEM

(71) Applicant: LG Electronics Inc., Seoul (KR)

(72) Inventors: Gi Won Park, Anyang-si (KR); Tae Gon Kong, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/862,721

(22) Filed: Apr. 15, 2013

(65) Prior Publication Data

US 2013/0231134 A1    Sep. 5, 2013

Related U.S. Application Data

(63) Continuation of application No. 12/649,281, filed on Dec. 29, 2009, now Pat. No. 8,442,561.

(60) Provisional application No. 61/141,670, filed on Dec. 31, 2008, provisional application No. 61/158,728, filed on Mar. 9, 2009, provisional application No. 61/161,765, filed on Mar. 19, 2009, provisional application No. 61/162,679, filed on Mar. 24, 2009.

(30) Foreign Application Priority Data

Apr. 24, 2009 (KR) .................. 10-2009-0035935
Aug. 26, 2009 (KR) .................. 10-2009-0079139

(51) Int. Cl.
  *H04Q 7/00*   (2006.01)
  *H04W 64/00*  (2009.01)
  *H04W 4/12*   (2009.01)

(52) U.S. Cl.
  CPC .............. *H04W 64/00* (2013.01); *H04W 4/12* (2013.01)

USPC ........... 455/458; 455/500; 455/502; 455/517; 455/436; 370/349; 370/210; 370/211; 370/312

(58) Field of Classification Search
  CPC ..................... H04W 36/0005; H04W 36/0061
  USPC ................ 455/458, 500, 502, 522, 517, 436; 370/349, 210, 211, 312
  See application file for complete search history.

(56) References Cited

U.S. PATENT DOCUMENTS

| | | | |
|---|---|---|---|
| 7,092,722 B1 | 8/2006 | Oh et al. | |
| 7,991,409 B2 | 8/2011 | Qi et al. | |

(Continued)

FOREIGN PATENT DOCUMENTS

| | | |
|---|---|---|
| CN | 1925669 A | 3/2007 |
| CN | 101035357 | 9/2007 |

(Continued)

OTHER PUBLICATIONS

The State Intellectual Property Office of the People's Republic of China Application Serial No. 200980150421, Office Action dated Aug. 23, 2013, 9 pages.

(Continued)

*Primary Examiner* — Ajit Patel
*Assistant Examiner* — Julio Perez
(74) *Attorney, Agent, or Firm* — Lee, Hong, Degerman, Kang & Waimey (57) ABSTRACT

A method for updating a location in a wireless communication system is disclosed. The method includes transmitting a request message to enter idle mode, receiving a response message including an Identifier (ID) of a first paging group and an ID of a second paging group in response to the request message, activating a paging group location update timer, when the MS leaves an area of the first paging group, and updating a location according to the paging group location update timer.

6 Claims, 6 Drawing Sheets

(56) References Cited

U.S. PATENT DOCUMENTS

| | | | |
|---|---|---|---|
| 8,208,920 B2 | 6/2012 | Sampath et al. | |
| 2004/0198353 A1* | 10/2004 | Quick, Jr. | 455/435.1 |
| 2005/0250474 A1* | 11/2005 | Hong et al. | 455/411 |
| 2006/0062175 A1* | 3/2006 | Ling et al. | 370/328 |
| 2007/0105600 A1* | 5/2007 | Mohanty et al. | 455/574 |
| 2007/0218926 A1 | 9/2007 | Zhuang et al. | |
| 2008/0259912 A1 | 10/2008 | Wang et al. | |
| 2008/0304434 A1 | 12/2008 | Giaretta et al. | |
| 2009/0176513 A1* | 7/2009 | Bosch et al. | 455/458 |
| 2010/0081454 A1* | 4/2010 | Wang et al. | 455/456.1 |
| 2010/0255860 A1 | 10/2010 | Ji | |

FOREIGN PATENT DOCUMENTS

| | | |
|---|---|---|
| CN | 101064722 A | 10/2007 |
| CN | 101138266 | 3/2008 |
| CN | 101330731 | 12/2008 |
| JP | 9-205677 | 8/1997 |
| JP | 2004289689 | 10/2004 |
| JP | 2005167941 | 6/2006 |
| KR | 10-2005-0050798 | 6/2005 |
| KR | 10-2005-0089697 | 9/2005 |
| KR | 10-0778339 | 11/2007 |
| KR | 10-2008-0011513 | 2/2008 |
| KR | 10-2008-0038797 | 5/2008 |
| KR | 10-2008-0044599 | 5/2008 |
| KR | 10-0875424 | 12/2008 |

OTHER PUBLICATIONS

The State Intellectual Property Office of the People's Republic of China Application Serial No. 200980153501.0, Office Action dated Jun. 9, 2013, 6 pages.
U.S. Appl. No. 13/139,916, Office Action dated Feb. 13, 2013, 7 pages.
Park, et al., "IEEE 802.16m Power Mangement Item", IEEE S802.16m-08/777, Jul. 2008, 11 pages.
Zheng, et al., "Paging in Femto", IEEE C802.16m-08/1266, Oct. 2008, 7 pages.
Park, et al., "Idle Mode Operation for Supporting FemtoCells", IEEE C802.16m-08/1433, Oct. 2008, 6 pages.

* cited by examiner

SPG : Small Paging Group
LPG : Large Paging Group

METHOD FOR UPDATING LOCATION IN A WIRELESS COMMUNICATION SYSTEM

CROSS-REFERENCE TO RELATED APPLICATIONS

This application is a continuation of U.S. application Ser. No. 12/649,281, filed Dec. 29, 2009, now U.S. Pat. No. 8,442,561, which claims the benefit of earlier filing date and right of priority to Korean Patent Application Nos. 10-2009-0035935, filed on Apr. 24, 2009, and 10-2009-0079139, filed on Aug. 26, 2009 which are hereby incorporated by reference as if fully set forth herein, and also claims the benefit of U.S. Provisional Application Ser. Nos. 61/141,670, filed on Dec. 31, 2008, 61/162,679, filed on Mar. 24, 2009, 61/158,728, filed on Mar. 9, 2009, and 61/161,765, filed on Mar. 19, 2009, the contents of all of which are incorporated by reference herein in their entireties.

BACKGROUND OF THE INVENTION

1. Field of the Invention

The present invention relates to a wireless communication system, and more particularly, to a method for updating a location in a wireless communication system.

2. Discussion of the Related Art

A description will first be made of idle mode of a Mobile Station (MS) and a paging group.

A broadband wireless access system supports idle mode to minimize the power consumption of MSs. Generally, idle mode is intended as a mechanism to allow an MS to become periodically available for downlink broadcast traffic messaging without requiring the MS to register to any particular Base Station (BS) as the MS moves in a radio link environment populated by multiple BSs.

The idle-mode MS does not need to perform a handover process during moving between BSs within the same paging area. Therefore, the MS may save power that might otherwise be consumed to transmit uplink information for the handover procedure.

A paging area is defined as an area covered by a paging group including a plurality of BSs and paging is a function of, upon generation of an incoming call, locating an MS for which the incoming call is intended (e.g. detecting a BS or a Mobile Switching Center (MSC) to which the MS belongs). The paging group is a logical group. The purpose of the paging group is to offer a contiguous coverage area in which the MS can be paged on a downlink if there is traffic targeted at it.

A paging group may include one or more BSs and one BS may be a member of one or more paging groups. Paging groups are defined in a management system. A paging group may use a paging group-action backbone message. A paging controller may use another backbone message, paging-announce, to manage a list of idle-mode MSs and initiate paging of an MS on all BSs belonging to a paging group.

When an MS requests transition to idle mode to a BS, the BS may transition the MS to the idle mode by transmitting its paging group Identifier (ID) to the MS.

Conventional paging and location update procedures will be described below.

Upon receipt of an incoming call or a packet for an idle-mode MS, a paging controller transmits a paging message to all BSs within a paging group and, upon receipt of the paging message, each BS broadcasts a Paging Advertisement (PAG-ADV) message to MSs managed by the BS. The idle-mode MS checks the PAG-ADV message and if the paging controller has paged the idle-mode MS, it may enter normal mode and communicate with its serving BS.

If a location update triggering condition is satisfied, the idle-mode MS updates its location. There are timer-based location update, paging group location update, power down update, and Medium Access Control (MAC) hash skip threshold update.

If the MS moves out of the area of its paging group to the area of another paging group, the MS performs a paging group location update.

When the MS moves to the area of another paging group, it transmits a Ranging Request (RNG-REQ) message to a target BS to update its location. The target BS replies to the MS with a Ranging Response (RNG-RSP) message including a paging group ID, PG_ID. Then the target BS notifies the paging controller of the new location of the MS.

If the paging group is too small, the MS should perform a location update often. On the other hand, if the paging group is too large, a paging load is great.

SUMMARY OF THE INVENTION

As described above, an MS should perform a location update often or a paging load is great depending on the size of the paging group of the MS in the conventional location update method.

An object of the present invention devised to solve the problem lies on a location update method for preventing frequent location updates of an MS, while a paging load is small.

Another object of the present invention devised to solve the problem lies on a location update method for allocating a paging group of an appropriate size to an MS according to the situation of the MS.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

The object of the present invention can be achieved by providing a location update method of an MS in a wireless communication system, including transmitting a request message to enter idle mode, receiving a response message including an ID of a first paging group and an ID of a second paging group in response to the request message, activating a paging group location update timer, when the MS leaves an area of the first paging group, and updating a location according to the paging group location update timer.

During the location update, mobility information of the MS may be informed to a BS.

During the location update, the MS may be allocated to a third paging group determined according to the mobility information of the MS.

In another aspect of the present invention, provided herein is a location update method of a BS in a wireless communication system including receiving a ranging request message for a location update from an MS, the ranging request message including mobility information of the MS, and transmitting to the MS a ranging response message including an ID of a paging group determined according to the mobility information of the MS.

The ranging response message may include an ID of a first paging group and an ID of a second paging group, and the paging group determined according to the mobility information of the MS may be the first paging group.

The ranging response message may include a value of a paging group location update timer, and the MS may activate the paging group location update timer when the MS leaves an area of the first paging group and update a location when the paging, group location update timer expires.

In a further aspect of the present invention, provided herein is an MS including a transmission module for transmitting a request message to enter idle mode, a reception module for receiving a response message including an ID of a first paging group and an ID of a second paging group in response to the request message, and a processor for activating a paging group location update timer, when the MS leaves an area of the first paging group and updating a location according to the paging group location update timer.

BRIEF DESCRIPTION OF THE DRAWINGS

The accompanying drawings, which are included to provide a further understanding of the invention, illustrate embodiments of the invention and together with the description serve to explain the principle of the invention.

In the drawings.

DETAILED DESCRIPTION OF THE INVENTION

Now, the above and other aspects of the present invention will be described in detail through preferred embodiments with reference to the accompanying drawings so that the present invention can be easily understood and realized by those skilled in the art. Modifications to the preferred embodiment will be readily apparent to those of ordinary skill in the art, and the disclosure set forth herein may be applied to other embodiments and applications without departing from the spirit and scope of the present invention and the appended claims. In the following description of the present invention, a detailed description of known functions and configurations incorporated herein will be omitted when it may obscure the subject matter of the present invention. The same reference numbers will be used throughout this specification to refer to the same or like parts.

Through the specification, when it is said that some part "includes" a specific element, this means that the part may further include other elements, not excluding them, unless otherwise mentioned. The term "-er(or)", "module", "portion" or "part" is used to signify a unit of performing at least one function or operation. The unit can be realized in hardware, software, or in combination of both.

A description will first be made of paging groups and a paging procedure according to an exemplary embodiment of the present invention.

Figure 1:
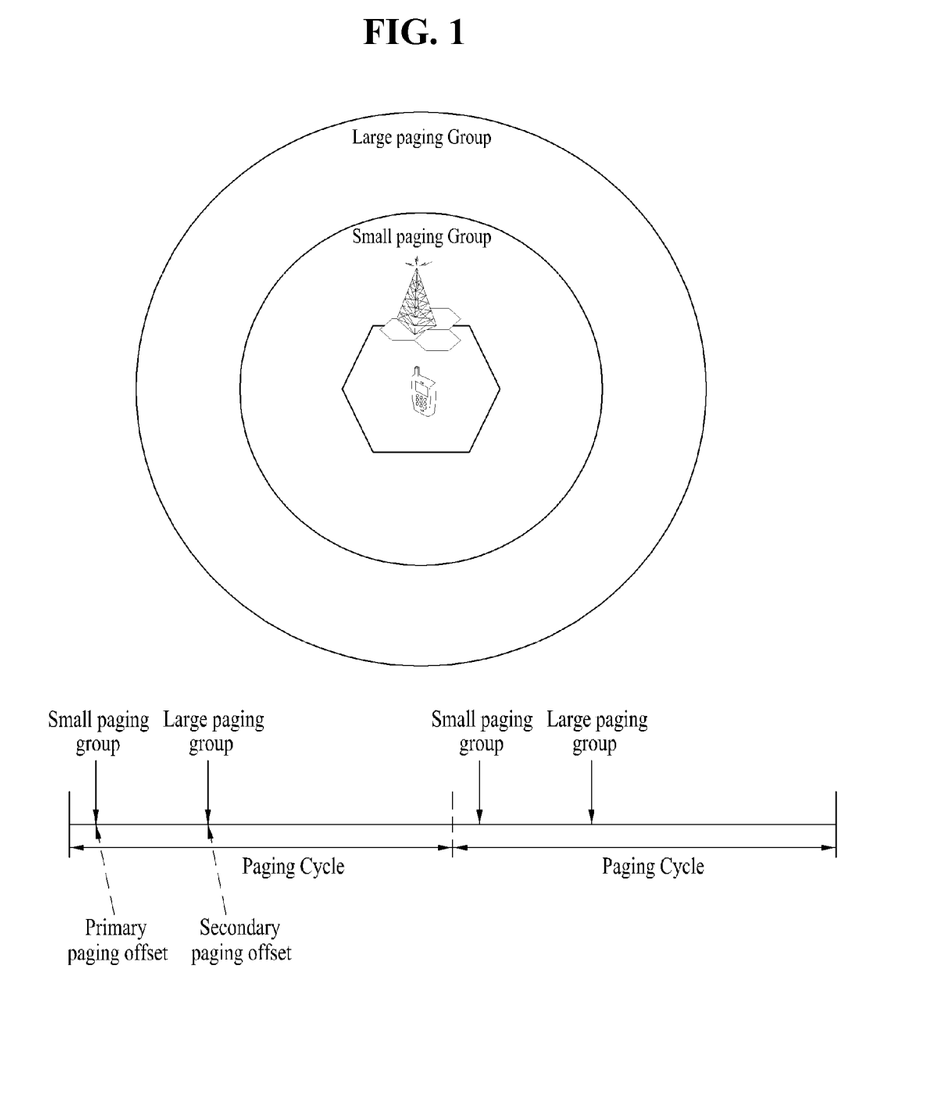
FIG. 1 illustrates a primary paging group and a secondary paging group allocated to a Mobile Station (MS) according to an embodiment of the present invention.

FIG. 1 illustrates a primary paging group and a secondary paging group allocated to a Mobile Station (MS) according to an embodiment of the present invention.

In accordance with the embodiment of the present invention, the MS may belong to a plurality of paging groups. As illustrated in FIG. 1, the MS may be a member of primary and secondary paging groups. The primary and secondary paging groups are also referred to as a small paging group and a large paging group, respectively.

The MS receives from a BS a primary paging offset corresponding to the primary paging group and a secondary paging offset corresponding to the secondary paging group, and monitors at the primary and secondary paging offsets whether there is a paging message directed to the MS.

Upon receipt of an incoming call or packet destined for the MS, a paging controller transmits a paging message to all BSs of the primary paging group to which the MS belongs. If the paging controller does not receive a response from any of the BSs in the primary paging group, it transmits a paging message to all BSs of the secondary paging group to which the MS belongs.

Now a description will be made of an idle mode transition and paging procedure of the MS in the wireless communication system according to an embodiment of the present invention, with reference to FIG. 2.

Figure 2:
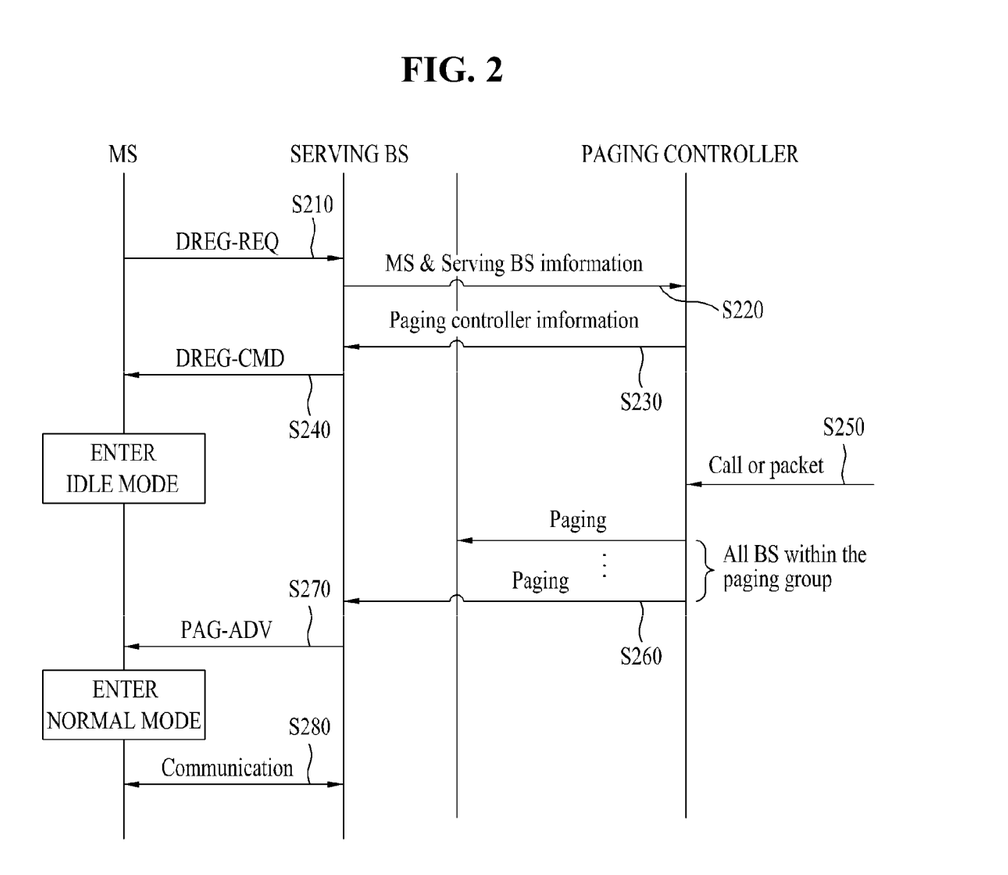
FIG. 2 is a diagram illustrating an idle mode transition and paging procedure of an MS in a wireless communication system according to an embodiment of the present invention.

FIG. 2 is a diagram illustrating an idle mode transition and paging procedure of an MS in a wireless communication system according to an embodiment of the present invention.

Paging may be carried out on a paging group basis in idle mode. For example, an MS may be a member of one or more paging groups. In each paging group, upon receipt of an incoming call for an MS or a packet directed to the MS from an external network, a paging controller pages the MS to locate it. For the paging, specifically, the paging controller may transmit a paging message to all BSs within the paging group and, upon receipt of the paging message, each BS broadcasts a Paging Advertisement (PAG-ADV) message to MSs managed by the BS.

Referring to FIG. 2, an MS transmits a Deregistration Request (DREG-REQ) message to a serving BS to transition from normal mode to idle mode in step S210.

In a location update method according to an embodiment of the present invention, to prevent frequent occurrences of a location update at the MS, when the MS moves from the area of the primary paging group (i.e. the primary paging area) to the area of the secondary paging group (i.e. the secondary paging area), the MS updates its location not immediately but a predetermined time later. For the delayed location update, a predetermined timer may be used, called a primary paging offset validity timer (P timer), a paging group location update timer (PG_LU_TIMER), or a location update delay timer.

The DREG-REQ message may include an MS-desired PG_LU_TIMER value.

Upon receipt of the DREG-REQ message, the serving BS transmits serving BS information and MS information to the paging controller in step S220. Specifically, the MS information may be an ID or Medium Access Control (MAC) ID of the MS, and the serving BS information may be an ID of the serving BS.

The paging controller transmits paging controller information to the serving BS in step S230. The paging controller information may be a paging group ID or a paging controller ID, which may be used for transmission and reception of a paging message.

The serving BS transmits a Deregistration Command (DREG-CMD) message to the MS in response to the DREG- REQ message in step S240. The DREG-CMD message may be named otherwise, such as a Deregistration Response (DREG-RSP) message.

Table 1 illustrates an example of the DREG-CMD message according to the embodiment of the present invention.

TABLE 1

| Syntax | Size (bit) | Notes |
|---|---|---|
| MOB_DREG-CMD_Message_format( ) { ~ | — | — |
| PG_LU_TIMER | | A current primary paging offset validity time until the next primary paging group (a primary paging offset and a secondary paging offset) is allocated to the MS, when the MS moves out of a current primary paging area. |
| Paging information { Primary paging group ID Secondary paging group ID Paging Cycle | | |
| Primary paging offset | | A time when the MS monitors a paging message transmitted in a primary paging area (CSG femtocell area). |
| Secondary paging offset | | A time when the MS monitors a paging message in a secondary paging area (overlay macro cell area) |
| Paging listening interval } ~ } //End of MOB_DREG-CMD | | A time period during which the MS monitors a paging message |

Referring to Table 1, the DREG-CMD message includes a determined PG_LU_TIMER value, a primary paging group ID, a secondary paging group ID, a paging cycle, a primary paging offset, a secondary paging offset, and a paging listening interval.

The primary paging offset indicates a time at which the MS monitors a paging message from the primary paging group. The secondary paging offset indicates a time at which the MS monitors a paging message from the secondary paging group. The paging listening interval is a time period in which the MS can communicate with the BS. In idle mode, the MS receives a paging message from the BS at a paging offset during the paging listening interval and does not receive a paging message from the BS during the remaining interval, that is, during an unavailable interval. Accordingly, the unavailable interval is defined as the remainder of subtracting the paging listening interval from the paging cycle.

Upon receipt of the DREG-CMD message, the MS enters the idle mode. The MS may receive a paging message based on paging information received in the DREG-CMD message. During a paging listening interval, the MS may monitor a radio channel to determine whether there is a paging message directed to it. The MS may operate in sleep mode (radio turn-off) during the remaining interval, thereby saving battery power.

In step S250, the paging controller may receive an incoming call or packet for the MS. Then the paging controller transmits a paging message to all BSs of the primary paging group of the MS in step S260. Upon receipt of the paging message, the BSs of the primary paging group broadcast a PAG-ADV message to their managed MSs in step S270. If the MS is located in the primary paging area, it checks the PAG-ADV message, enters normal mode, and communicates with the serving BS in step S280.

On the other hand, if the MS is not in the primary paging group area it may not receive the PAG-ADV message, and the paging controller transmits a paging message to all BSs of the secondary paging group of the MS. Upon receipt of the paging message, the BSs of the secondary paging group broadcast a PAG-ADV message to their managed MSs. Upon receipt of the PAG-ADV message, the MS enters normal mode and communicates with the serving BS in the normal mode.

As described above, the paging controller first pages the MS at the primary paging offset. When the paging controller fails to receive a response message, it pages the MS at the secondary paging offset. In case the MS fails to receive a PAG-ADV message, the paging controller may page the MS repeatedly at the primary and secondary paging offsets. When the paging controller pages the MS a plurality of times, it compares the PG_LU_TIMER value with the time period between a last paging time at the primary paging offset and a paging time at the secondary paging offset. If the time period is larger than the PG_LU_TIMER value, the paging controller performs an MS management procedure by deleting the MS from a paging list or performing a forced location update, considering that the MS has transitioned to an abnormal state.

A location update method according to an embodiment of the present invention will be described with reference to FIG. 3.

Figure 3:
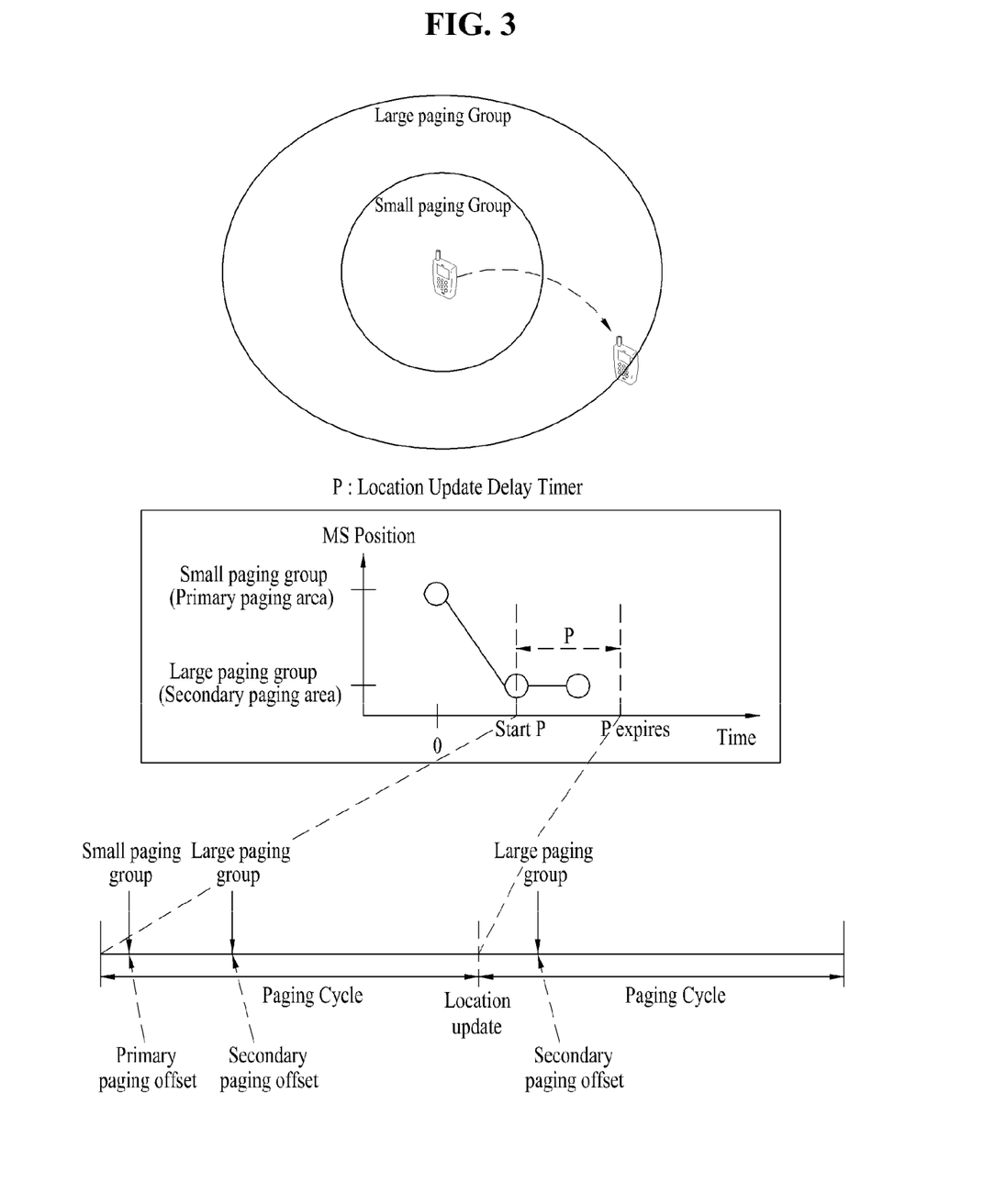
FIG. 3 illustrates a location update method according to an embodiment of the present invention.

FIG. 3 illustrates a location update method according to an embodiment of the present invention.

Referring to FIG. 3, when an MS moves out of a primary paging group area and enters a secondary paging group area, the MS activates a PG_LU_TIMER.

Starting from the activation time of the PG_LU_TIMER, the MS monitors paging messages at primary and secondary paging offsets. Because the MS is out of the primary paging group area, it may not receive a paging message at the primary paging offset. Thus, the MS receives a paging message at the secondary paging offset after the activation time of the PG_LU_TIMER.

If the MS returns to the primary paging group area before expiration of the PG_LU_TIMER, the MS deactivates the PG_LU_TIMER without updating its location.

On the other hand, if the MS does not return to the primary paging area until the expiration of the PG_LU_TIMER, the MS updates its location. For the location update, the MS transmits a Ranging Request (RNG-REQ) message to the BS. Table 2 below illustrates an exemplary RNG-REQ message according to the embodiment of the present invention.

TABLE 2

| Syntax | Size (bit) | Notes |
|---|---|---|
| MOB_RNG-REQ_Message_format( ) { ~ | — | — |
| PG_LU_TIMER | | A current primary paging offset validity time until the next primary paging group (a primary paging offset and a secondary paging offset) is allocated to the MS, when the MS moves out of a current primary paging area. |

TABLE 2-continued

| Syntax | Size (bit) | Notes |
|---|---|---|
| Paging Information { primary paging group ID secondary paging group ID Paging Cycle | | |
| Primary paging offset | | A time when the MS monitors a paging message in a primary paging area (CSG femtocell area). |
| Secondary paging offset | | A time when the MS monitors a paging message in a secondary paging area (overlay macro cell area). |
| Paging listening interval } | | A time period during which the MS monitors a paging message. |
| Mobility | 2 bit | 0b00: Slow 0b01: Medium 0b10: Fast 0b11: Reserved |
| ~ } //End of MOB_RNG-REQ | | |

Referring to Table 2, the RNG-REQ message may include information about the mobility of the MS. For example, the mobility information about the MS may be expressed in 2 bits, representing 'Slow', 'Medium' or 'Fast'. More values may be defined for the mobility information about the MS. Upon receipt of the mobility information about the MS, the paging controller may allocate a paging group to the MS according to the mobility of the MS. Specifically, when the MS moves fast, a secondary paging group is allocated to the MS. When the MS moves slowly, a primary paging group is allocated to the MS. The paging group allocated to the MS according to the mobility of the MS may be a primary paging group.

Upon receipt of the RNG-REQ message, the BS transmits a Ranging Response (RNG-RSP) message to the MS in response to the RNG-REQ message.

Table 3 illustrates an exemplary RNG-RSP message according to the embodiment of the present invention.

TABLE 3

| Syntax | Size (bit) | Notes |
|---|---|---|
| MOB_RNG-RSP_Message_format( ) { ~ | — | — |
| P timer (Primary paging offset validity timer) | | A current primary paging offset validity time until the next primary paging group (a primary paging offset and a secondary paging offset) is allocated to the MS, when the MS moves out of a current primary paging area. |
| Paging Information { Small paging group ID Large paging group ID Paging Cycle | | |
| Primary paging offset | | A time when the MS monitors a paging message in a primary paging area (CSG femtocell area). |
| Secondary paging offset | | A time when the MS monitors a paging message in a secondary paging area (overlay macro cell area). |

TABLE 3-continued

| Syntax | Size (bit) | Notes |
|---|---|---|
| Paging listening interval } | | A time period during which the MS monitors a paging message. |
| ~ } //End of MOB_RNG-RSP | | |

In Table 3, the RNG-RSP message includes a PG_LU_TIMER value, a primary paging group ID, a secondary paging group ID, a paging cycle, a primary paging offset, a secondary paging offset, and a paging listening interval.

As described above, the primary paging group is allocated to the MS, taking into account the mobility of the MS.

The RNG-RSP message includes a new PG_LU_TIMER value.

In the location update method according to the embodiment of the present invention, when the MS returns to the primary paging area before expiration of the PG_LU_TIMER, it does not update its location. If the MS is out of the primary paging area when the PG_LU_TIMER expires, it updates its location.

It may further be contemplated that when the MS moves out of the primary paging area, it activates the PG_LU_TIMER and updates its location upon expiration of the PG_LU_TIMER irrespective of whether the MS returns to the primary paging area.

A location update method according to another embodiment of the present invention will be described below with reference to FIG. 4.

Figure 4:
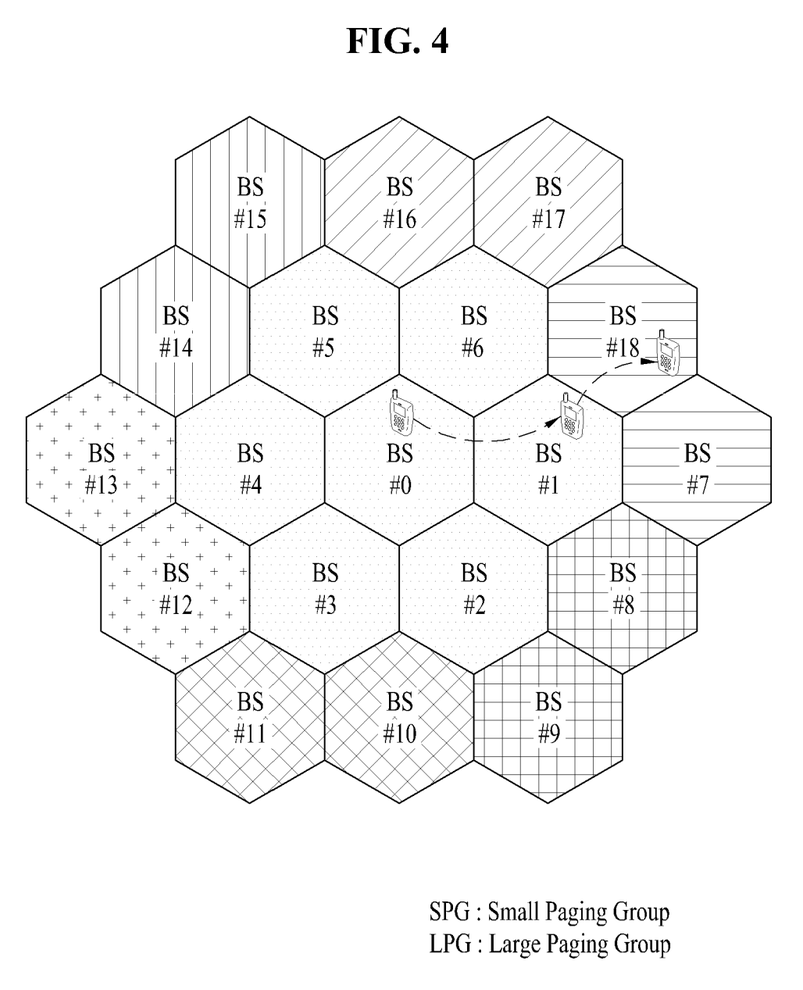
FIG. 4 illustrates paging groups used in a location update method according to another embodiment of the present invention.

FIG. 4 illustrates paging groups according to a location update method according to another embodiment of the present invention.

Paging groups may be classified into a primary paging group, a secondary paging group, and a medium paging group according to the sizes of the areas of the paging groups.

Referring to FIG. 4, the coverage area of each BS is set as a primary paging group and the coverage area of the BS and BSs at a first tier, tier 1 around the BS is set as a secondary paging group.

Specifically, each of 1st to 19th BSs, BS #0 to BS #18 forms one paging group and has a paging group ID. The 1st to 7th BSs, BS #0 to #6 form a secondary paging group.

If the MS belongs to a primary paging group, for example, the primary paging group of BS #0, the movement of the MS from BS #0 to BS #1 is an inter-primary paging group movement. When an MS belonging to BS #1 moves to BS #18, this is also an inter-primary paging group movement.

If the MS belongs to a secondary paging group, for example, the secondary paging group of BS #0 to BS #6, the movement of the MS from BS #1 to BS #18 is an inter-secondary paging group movement.

A secondary paging group may be formed adaptively for the MS. That is, the paging controller may configure a paging group for the MS, whenever the MS updates its location.

For example, BSs at tier 1 around a BS to which the MS belongs when it updates its location may form a secondary paging group for the MS in FIG. 4. Hence, a paging group is determined for the MS whenever the MS performs a location update. If the MS belongs to a primary paging group and updates its location to BS #0, a secondary paging group including BS #0 to BS #6 is allocated to the MS. If the MS updates its location to BS #1, a secondary paging group with BS #0, BS #1, BS #2, BS #6, BS #7, BS #8 and BS #18 is allocated to the MS.

Even when the MS operates in the secondary paging group, the paging controller may determine the members of the secondary paging group whenever the MS updates its location. BSs of a neighbor secondary paging group that page an MS at the secondary frequency offset may be determined according to the secondary paging group of the MS.

To prevent frequent movements of an MS between primary paging groups or between secondary paging groups, the PG_LU_TIMER is used in the location update method according to this embodiment of the present invention.

Regarding a movement of an MS to which a primary paging group is allocated, when the MS moves from BS #0 to BS #1, it activates the PG_LU_TIMER. If the MS returns to BS #0 before expiration of the PG_LU_TIMER, it deactivates the PG_LU_TIMER without updating its location. On the other hand, if the MS does not return to BS #0 until the expiration of the PG_LU_TIMER, it updates its location.

During running the PG_LU_TIMER, the MS monitors a paging message at a secondary paging offset. In the presence of traffic directed to the MS, the paging controller pages the MS at a primary paging offset. When it fails to receive a response for the paging, the paging controller pages the MS at the secondary paging offset following the primary paging offset. BSs of the secondary paging group including the primary paging group of the MS broadcast a PAG-ADV message at the secondary paging offset. For example, in the case where the MS moves from BS #0 to BS #1, BS #0 to BS #6 broadcast the PAG-ADV message.

When the MS moves a plurality of times between primary paging areas within the secondary paging area during running the PG_LU_TIMER, the MS updates its location only if upon expiration the PG_LU_TIMER, the MS is located in a primary paging area other than the primary paging area in which the MS was located just before the activation of the PG_LU_TIMER. For example, if the MS activates the PG_LU_TIMER along with its movement from BS #0 to BS #1, moves from BS #1 to BS #6 during running the PG_LU_TIMER, and stays in BS #6 when the PG_LU_TIMER expires, the MS updates its location to BS #6 in FIG. 4.

If the MS moves out of the secondary paging area during running the PG_LU_TIMER, it immediately updates its location. In FIG. 4, for example, when it leaves BS #0 and enters BS #1, the MS activates the PG_LU_TIMER. Then the MS moves to BS #18 during running the PG_LU_TIMER. Thus the MS updates its location immediately.

In the case where a secondary paging group is allocated to the MS and the MS moves to another secondary paging group, the MS may update its location using the PG_LU_TIMER. One thing to note herein is that all BSs of a secondary paging group neighboring to the secondary paging group of the MS may broadcast a paging broadcast message at the secondary paging offset.

Figure 5:
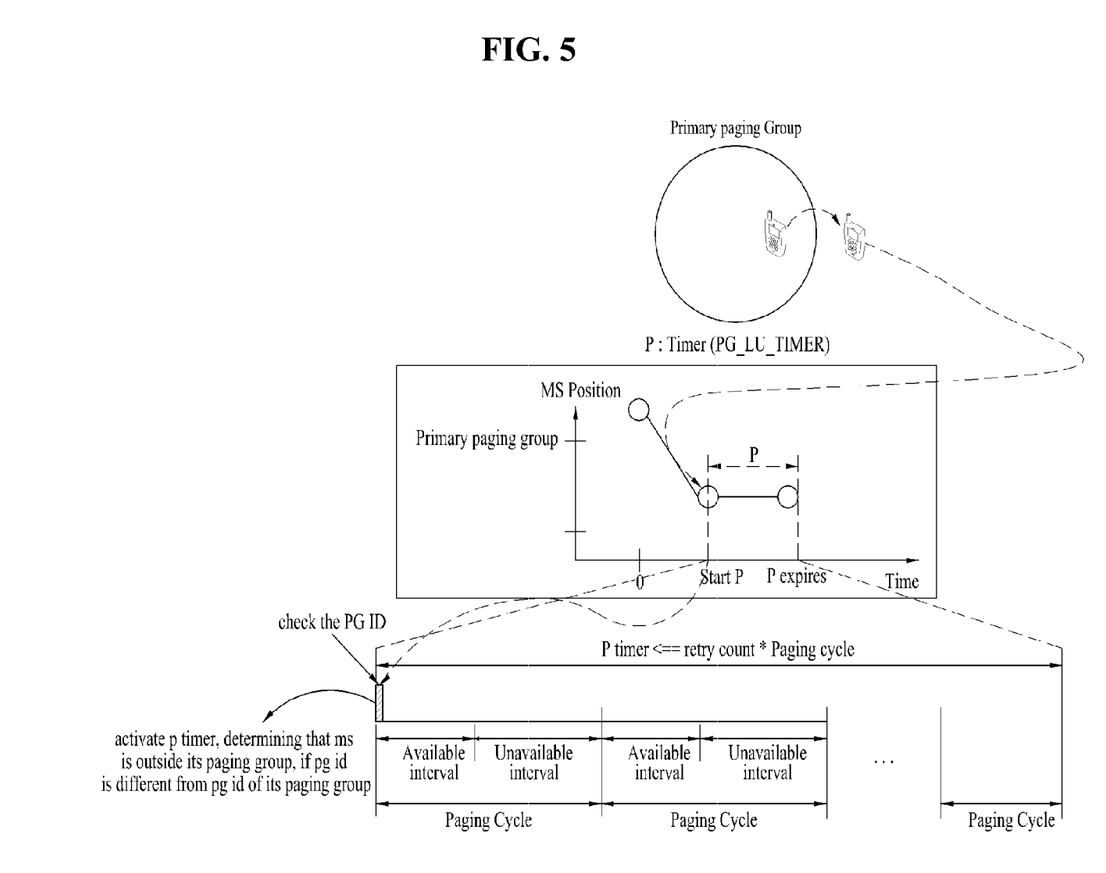
FIG. 5 illustrates a location update method according to a further embodiment of the present invention.

FIG. 5 illustrates a location update method according to a further embodiment of the present invention.

This embodiment is about a method for updating a location using the PG_LU_TIMER when one paging group is allocated to an MS.

The MS transmits a Deregistration Request (DREG-REQ) message to a serving BS.

Table 4 below illustrates a format of a DREG-REQ message according to the embodiment of the present invention.

TABLE 4

| Syntax | Size (bit) | Notes |
|---|---|---|
| MOB_DREG-REQ_Message_format() { | — | — |
| ~ | | |
| De-registration_Request_Code | | |
| PG_LU_TIMER | | A current paging offset validity time until the next paging group is allocated to an MS, when the MS moves out of a current paging area. |
| TLV encoded parameters | | |
| ~ | | |
| } //End of MOB_DREG-REQ | | |

Referring to Table 4, the DREG-REQ message may include a PG_LU_TIMER value. The MS may include a previously used PG_LU_TIMER value or a desired PG_LU_TIMER value in the DREG-REQ message.

The PG_LU_TIMER value may be set to be equal to or smaller than 'number of paging retries x paging cycle'. The number of paging retries is a maximum number of pagings that the paging controller retries. When the paging controller fails to receive a response for a paging, it retries paging. If the paging controller fails to receive a response in spite of a predetermined maximum number of pagings, the paging controller discontinues the paging. That is, the number of paging retries is the predetermined maximum number of pagings that the paging controller retries.

Alternatively or additionally, the PG_LU_TIMER value may be set to be equal to or smaller than the paging cycle, or it may be set to be equal to or smaller than 'number of paging retries x timer value of paging controller'. The timer value of the paging controller corresponds to a time period between a paging and a paging retry of the paging controller. After the paging controller attempts a paging, it activates its timer. When the paging controller fails to receive a response for the paging until expiration of the timer, the paging controller retries the paging.

When the MS belongs to a plurality of paging groups, a PG_LU_TIMER value may be larger than the above-described PG_LU_TIMER values.

If the MS belongs to one paging group and the PG_LU_TIMER value is 0, this means that the MS updates its location as soon as it leaves the paging area.

On the other hand, if the MS belongs to a plurality of paging groups and the PG_LU_TIMER value is 0, this means that even though the MS leaves a primary paging area, it does not update its location and receives a paging message from a secondary paging group. That is, the PG_LU_TIMER is optionally used.

In response to the DREG-REQ message, the MS receives a DREG-CMD message from the BS.

Table 5 below illustrates a format of the DREG-CMD message according to the embodiment of the present invention.

TABLE 5

| Syntax | Size (bit) | Notes |
|---|---|---|
| MOB_DREG-CMD_Message_format() { | — | — |
| ~ | | |
| P timer (Primary paging offset validity timer) | | A current paging offset validity time until the next paging group |

TABLE 5-continued

| Syntax | Size (bit) | Notes |
| --- | --- | --- |
|  |  | is allocated to an MS, when the MS moves out of a current paging area. |
| Paging information { paging group ID Paging Cycle paging offset |  |  |
| Paging listening interval |  | A time period during which the MS monitors a paging message. |
| } ~ } //End of MOB_DREG-CMD |  |  |

Referring to Table 5, the BS may include a finally determined PG_LU_TIMER value (P timer value) in the DREG-CMD message. If the BS does not transmit any PG_LU_TIMER value to the MS, this implies that the PG_LU_TIMER value is 0.

As noted from Table 5, an idle-mode MS receives paging group ID information during a paging listening interval and checks a paging group ID. If the paging group ID is different from the ID of a paging group to which the MS belongs, the MS considers that it has moved out of the area of its paging group and activates the PG_LU_TIMER.

When the MS does not return to its paging area until expiration of the PG_LU_TIMER, the MS updates its location.

On the contrary, if the MS returns to the paging area until the expiration of the PG_LU_TIMER, the MS deactivates the PG_LU_TIMER without updating its location.

For the location update, the MS transmits an RNG-REQ message to the BS. Table 6 illustrates a format of the RNG-REQ message according to the embodiment of the present invention.

TABLE 6

| Syntax | Size (bit) | Notes |
| --- | --- | --- |
| MOB_RNG-REQ_Message_format( ) { ~ | — | — |
| P timer (Primary paging offset validity timer) |  | A current paging offset validity time until the next paging group is allocated to an MS, when the MS moves out of a current paging area. |
| Paging Information { paging group ID Paging Cycle paging offset |  |  |
| Paging listening interval |  | A time period during which the MS monitors a paging message. |
| } Mobility | 2 bit | 0b00: Slow 0b01: Medium 0b10: Fast 0b11: Reserved |
| ~ } //End of MOB_RNG-REQ |  |  |

Referring to Table 6, the MS may include a previously used PG_LU_TIMER value or a desired PG_LU_TIMER in the RNG-REQ message.

When updating its location, the MS may notify the BS of its mobility information (fast, medium, or slow) so that a network may allocate a paging group of a size corresponding to the mobility of the MS to the MS. A large paging group (a secondary paging group) may be allocated to the MS when the MS moves fast and a small paging group (a primary paging group) may be allocated to the MS when the MS moves slowly.

Then the MS receives an RNG-RSP message from the BS.

Table 7 illustrates a format of the RNG-RSP message according to the embodiment of the present invention.

TABLE 7

| Syntax | Size (bit) | Notes |
| --- | --- | --- |
| MOB_RNG-RSP_Message_format( ) { ~ | — | — |
| P timer (Primary paging offset validity timer) |  | A current paging offset validity time until the next paging group is allocated to an MS, when the MS moves out of a current paging area. |
| Paging Information { paging group ID Paging Cycle paging offset |  |  |
| Paging listening interval |  | A time period during which the MS monitors a paging message. |
| } ~ } //End of MOB_RNG-RSP |  |  |

As stated before, the MS may receive a PG_LU_TIMER value (a P timer value) from the BS in the DREG-CMD message, the RNG-RSP message, a SuperFrame Header (SFH), or an Advanced Air Interface Neighbor Advertisement (AAI_NBR-ADV) message. Besides, the PG_LU_TIMER value may be preset as a system parameter.

Figure 6:
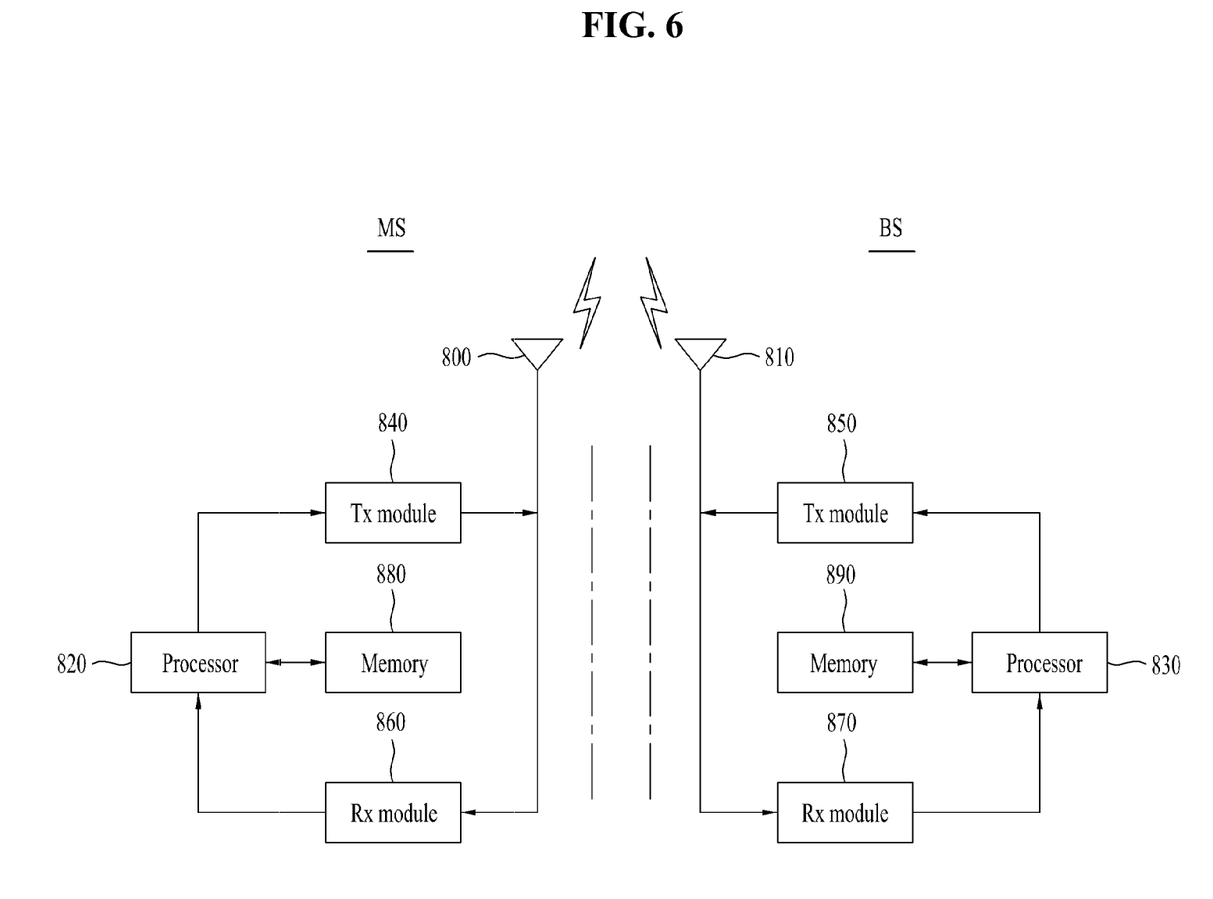
FIG. 6 is a block diagram of an MS and a Base Station (BS) for implementing the embodiments of the present invention, according to an embodiment of the present invention.

FIG. 6 is a block diagram of an MS (or Advanced MS (AMS)) and a BS (or Advanced BS (ABS)) for implementing the embodiments of the present invention, according to an embodiment of the present invention.

Referring to FIG. 6, each of the MS and the ES includes an antenna 800 or 810 for transmitting and receiving information, data, signals and/or messages, a Transmission (Tx) module 840 or 850 for transmitting a messages by controlling the antenna 800 or 810, a Reception (RX) module 860 or 870 for receiving a message by controlling the antenna 800 or 810, a memory 880 or 890 for storing information related to communication between the MS and the BS, and a processor 820 or 830 for controlling the Tx module 840 or 850, the Rx module 860 or 870, and the memory 880 or 890. The BS may be a femto BS or a macro BS.

The antennas 800 and 810 externally transmit signals generated from the TX modules 840 and 850 or output received external Radio Frequency (RF) signals to the RX modules 860 and 870. When Multiple input Multiple Output (MIMO) is supported, two or more antennas may be used.

The processors 820 and 830 provide overall control to the MS and the BS. Particularly, the processors 820 and 830 may perform a control function for implementing the embodiments of the present invention, a variable MAC frame control function based on service characteristics and a propagation environment, a handover function, and an authentication and encryption function. Each of the processors 820 and 830 may further include an encryption module for encrypting various messages and a timer for controlling transmission and reception of various messages.

The Tx modules 840 and 850 may encode and modulate transmission signals and/or data scheduled by the processors 820 and 830 in a predetermined coding and modulation scheme and outputs the modulated signals and/or data to the antennas 800 and 810.

The Rx modules 860 and 870 may recover the original data by decoding and modulating RF signals received through the antennas 800 and 810 and thus may provide the original data to the processors 820 and 830.

The memories 880 and 890 may store programs for processing and control operations of the processors 820 and 830 and temporarily store input/output data. For example, the memory 880 of the MS may temporarily store an uplink grant, system information, a Station ID (STID), a Flow ID (FID), action time information, resource allocation information, and frame offset information, which are received from the BS.

Also, each of the memories 880 and 890 may include at least one of a flash memory-type storage medium, a hard disc-type storage medium, a multimedia card micro-type storage medium, a card-type memory (e.g. an Secure Digital (SD) or extreme Digital (XS) memory), a Random Access Memory (RAM), a Read-Only Memory (ROM), an Electrically Erasable Programmable Read-Only Memory, a Programmable Read-Only Memory, a magnetic memory, a magnetic disc, and optical disk.

Various embodiments have been described in the best mode for carrying out the invention.

The present invention provides is applicable to a wireless communication system. More particularly, the present invention is applicable to a method for updating a location in a wireless communication system.

The embodiments of the present invention may be achieved by various means, for example, hardware, firmware, software, or a combination thereof. In a hardware configuration, the methods for updating a location in a wireless communication system according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods for updating a location in a wireless communication system according to the embodiments of the present invention may be implemented in the form of a module, a procedure, a function, etc. performing the above-described functions or operations. A software code may be stored in a memory unit and executed by a processor. The memory unit is located at the interior or exterior of the processor and may transmit and receive data to and from the processor via various known means.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

It is obvious to those skilled in the art that claims that are not explicitly cited in each other in the appended claims may be presented in combination as an exemplary embodiment of the present invention or included as a new claim by a subsequent amendment after the application is filed.

Embodiments of the present invention have the following effects.

A primary paging group and a secondary paging group are allocated to an MS and a paging group location update timer is used. Thus the MS does not need to perform a location update frequently, while a paging load is small.

Since a paging group is determined for an MS based on the mobility of the MS, a paging group of an appropriate size can be allocated to the MS.

If an MS is a member of a single paging group, frequent location updates of the MS are prevented using a location update timer.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

What is claimed is:

1. A method of performing a location update at a mobile station (MS) in a wireless communication system, the method comprising:
   receiving, by the MS from a base station (BS), first information regarding a plurality of paging groups assigned for the MS;
   starting, by the MS, a paging group location update timer when the MS leaves a first paging group of the plurality of paging groups but stays within a second paging group of the plurality of paging groups;
   performing, by the MS, the location update after the paging group location update timer expires if the MS stays within the second paging group when the paging group location update timer expires;
   transmitting, by the MS to the BS, mobility information related to movement of the MS, the mobility information being represented as one of three different speed levels of the MS; and
   receiving, by the MS from the BS, second information regarding a new paging group assigned for the MS, the new paging group being assigned to the MS based on the represented one of the three different speed levels of the MS,
   wherein the first information comprises a paging group identifier (PGID) of each of the plurality of paging groups.

2. The method of claim 1, wherein:
   the first paging group is a primary paging group; and
   the second paging group is a secondary paging group.

3. The method of claim 1, further comprising:
   determining a current paging group by monitoring a paging group identifier of the BS.

4. A mobile station (MS) for performing a location update in a wireless communication system, the MS comprising:
   a transmitter;
   a receiver; and
   a processor operatively connected to the transmitter and the receiver, the processor configured to:
   receive, from a base station (BS), first information regarding a plurality of paging groups assigned for the MS;
   start a paging group location update timer when the MS leaves a first paging group of the plurality of paging groups but stays within a second paging group of the plurality of paging groups;
   perform the location update after the paging group location update timer expires if the MS stays within the second paging group when the paging group location update timer expires;
   transmit mobility information to the BS, the mobility information related to movement of the MS, the mobility information being represented as one of three different speed levels of the MS; and receive, from the BS, second information regarding a new paging group assigned for the MS, the new paging group being assigned to the MS based on the represented one of the three different speed levels of the MS, wherein the first information comprises a paging group identifier (PGID) of each of the plurality of paging groups.

5. The MS of claim 4, wherein:
the first paging group is a primary paging group; and
the second paging group is a secondary paging group.

6. The MS of claim 4, wherein the processor is further configured to:
determine a current paging group by monitoring a paging group identifier of the BS.

* * * * *